(12) United States Patent
Piper et al.

(10) Patent No.: US 7,362,017 B2
(45) Date of Patent: Apr. 22, 2008

(54) MOTOR WITH INTEGRATED DRIVE UNIT AND SHARED COOLING FAN

(75) Inventors: Jason A. Piper, Taylors, SC (US); Michael J. Dudas, Greer, SC (US); Douglas H. Sudhoff, Madison, IN (US)

(73) Assignee: Reliance Electric Technologies, LLC, Mayfield Heights, OH (US)

(*) Notice: Subject to any disclaimer, the term of this patent is extended or adjusted under 35 U.S.C. 154(b) by 401 days.

(21) Appl. No.: 11/156,827

(22) Filed: Jun. 20, 2005

(65) Prior Publication Data

US 2006/0284498 A1 Dec. 21, 2006

(51) Int. Cl.
*H02K 9/00* (2006.01)

(52) U.S. Cl. .......... 310/63; 310/68 R; 310/89

(58) Field of Classification Search ........... 310/62–63, 310/68 R, 89
See application file for complete search history.

(56) References Cited

U.S. PATENT DOCUMENTS

| | | | |
|---|---|---|---|
| 6,445,099 B1 * | 9/2002 | Roseman | 310/90 |
| 6,472,782 B1 * | 10/2002 | Selci | 310/63 |
| 6,692,240 B1 * | 2/2004 | Leonhard et al. | 417/372 |
| 6,700,235 B1 * | 3/2004 | McAfee | 310/52 |
| 6,731,036 B2 * | 5/2004 | Ghiotto | 310/89 |
| 7,042,121 B2 * | 5/2006 | De Filippis et al. | 310/63 |
| 7,265,463 B2 * | 9/2007 | Kusase et al. | 310/62 |
| 2003/0184172 A1 * | 10/2003 | Ghiotto | 310/89 |
| 2004/0051412 A1 * | 3/2004 | Vohlgemuth et al. | 310/89 |
| 2005/0001492 A1 * | 1/2005 | Bradfield et al. | 310/68 D |
| 2005/0023912 A1 * | 2/2005 | Lin et al. | 310/89 |

* cited by examiner

Primary Examiner—Thanh Lam
(74) Attorney, Agent, or Firm—Thompson Coburn LLP

(57) ABSTRACT

An integrated motor and drive assembly includes a motor, a fan, and a drive unit. The motor is responsive to at least one drive signal. The fan is axially aligned with the motor and operable to generate a cooling flow. The drive unit is axially aligned with the fan and operable to generate the drive signal. The cooling flow traverses the motor and the drive unit.

8 Claims, 3 Drawing Sheets

MOTOR WITH INTEGRATED DRIVE UNIT AND SHARED COOLING FAN

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to the art of integrated motor and drive systems and, more particularly, to a motor with an integrated drive unit and a shared cooling fan.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Motors have broad application in industry, particularly when large horsepower is needed. Typically, power in the form of AC current provided by a utility is not suitable for end use in consuming facilities. Thus, prior to end use, power delivered by a utility is converted to a useable form. To this end, a typical power "conditioning" configuration includes an AC-to-DC rectifier that converts the utility AC power to DC across positive and negative DC buses (i.e., across a DC link) and an inverter linked to the DC link that converts the DC power back to three phase AC power having an end-useable form (e.g., three phase, relatively high frequency AC voltage). A controller controls the inverter in a manner calculated to provide voltage waveforms required by the consuming facility. The inverter includes a plurality of switches that can be controlled to link and delink the positive and negative DC buses to motor supply lines. The linking-delinking sequence causes voltage pulses on the motor supply lines that together define alternating voltage waveforms. When controlled correctly, the waveforms cooperate to generate a rotating magnetic field inside the motor stator core. In an induction motor, the magnetic field induces a field in motor rotor windings. The rotor field is attracted to the rotating stator field and thus the rotor rotates within the stator core. In a permanent magnet motor, one or more magnets on the rotor are attracted to the rotating magnetic field. The rectifier, inverter, and control circuitry are commonly referred to as a motor drive unit.

The use of integrated units where the motor drive is integrated with the motor to create an "integrated motor and drive system" has become more widely used. One advantage of such systems is their compactness and ease of installation into a larger industrial or other application, due largely to the close proximity of the drive to the motor. Generally, the drive is disposed on the motor or arranged in an integral housing with the motor.

One issue arising from the integrated motor and drive system arrangement involves providing adequate cooling flow to dissipate the collective heat generated by the motor and drive. Previous techniques for providing cooling for an integrated motor and drive involve providing independent cooling for the motor drive or diverting a portion of the cooling flow from the motor fan to impinge upon the motor drive or a heat sink associated with the motor drive. These solutions add cost to the motor drive assembly and sometimes fail to provide adequate cooling, as only a portion of the cooling flow is employed.

Another disadvantage is that heat sinks applied to motor drive components typically provide a cooling effect that is substantially uniform over its surface area. This is due to the even, or regular, distribution of the heat transfer fins on the face of the heat sink. This design limitation largely ignores the reality in motor drives that certain power and other electronic components generate large amounts of heat, while other devices may generate only small amounts. Thus, a traditional heat sink requires that either the power components be evenly distributed over the heat sink surface with regard to their power generating capabilities, or that a large enough heat sink is used to compensate for "hot spots" created by the physical arrangement of power components to provide for adequate cooling of the largest expected localized areas of heat generation.

BRIEF SUMMARY OF THE INVENTION

The present inventors have recognized that a motor and drive assembly may be implemented where a motor is axially aligned with a motor drive unit to allow cooling flow generated by a fan associated with the motor to cool both the motor and the motor drive unit.

One aspect of the present invention is seen in an assembly including a motor, a fan, and a drive unit. The motor is responsive to at least one drive signal. The fan is axially aligned with the motor and operable to generate a cooling flow. The drive unit is axially aligned with the fan and operable to generate the drive signal. The cooling flow traverses the motor and the drive unit.

Another aspect of the present invention is seen in an assembly including a motor, a fan, a fan shroud, a drive unit, and a drive enclosure. The motor is responsive to at least one drive signal. The fan is axially aligned with the motor and operable to generate a cooling flow. At least a portion of the cooling flow traverses the motor. The fan shroud is mounted to the motor and defines a fan cavity enclosing at least a portion of the fan and at least one opening communicating with the fan cavity. The drive unit is disposed within the cooling flow and operable to generate the drive signal. The drive enclosure is mounted to the fan shroud and defines a drive cavity enclosing at least a portion of the drive unit and at least one vent communicating with the drive cavity.

Yet another aspect of the present invention is seen in an assembly including a motor, a fan, and a drive unit. The motor is responsive to at least one drive signal. The fan is operable to generate a cooling flow including an intake component and an exhaust component. The drive unit is operable to generate the drive signal. One of the intake component and the exhaust component traverses the drive unit and the other of the intake component and the exhaust component traverses the motor.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
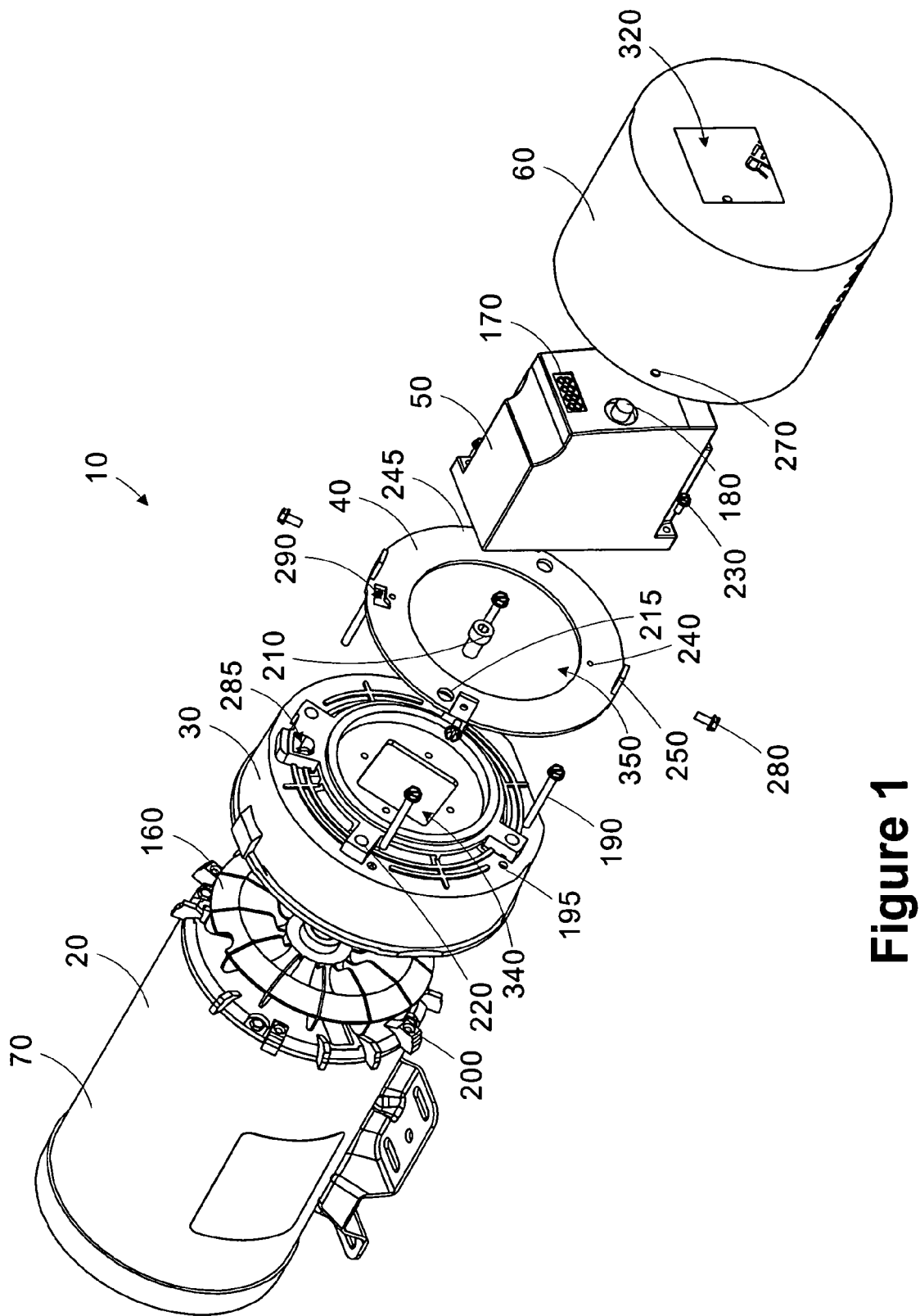
FIG. 1 is an exploded isometric view of an integrated motor and drive assembly in accordance with one embodiment of the present invention.
Figure 2:
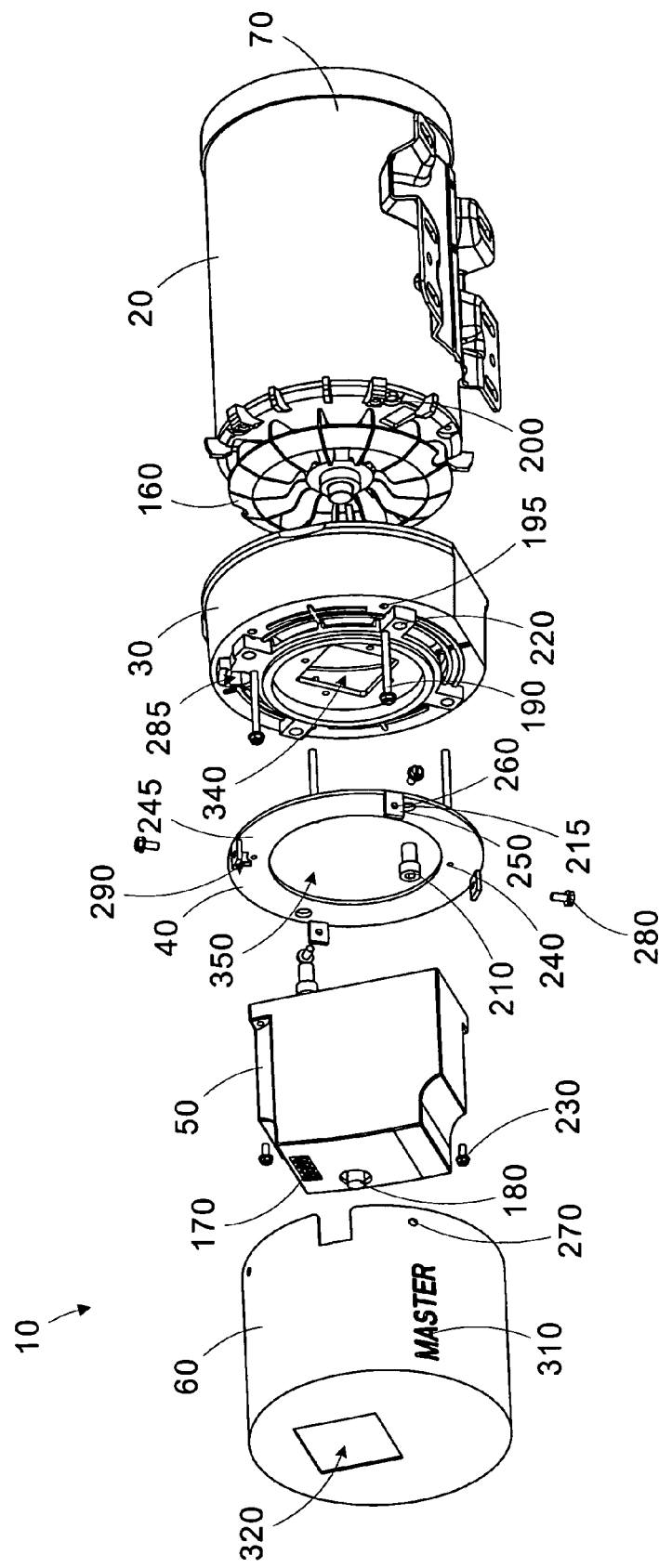
FIG. 2 is an exploded side view of the motor and drive assembly of FIG. 1.
Figure 3:
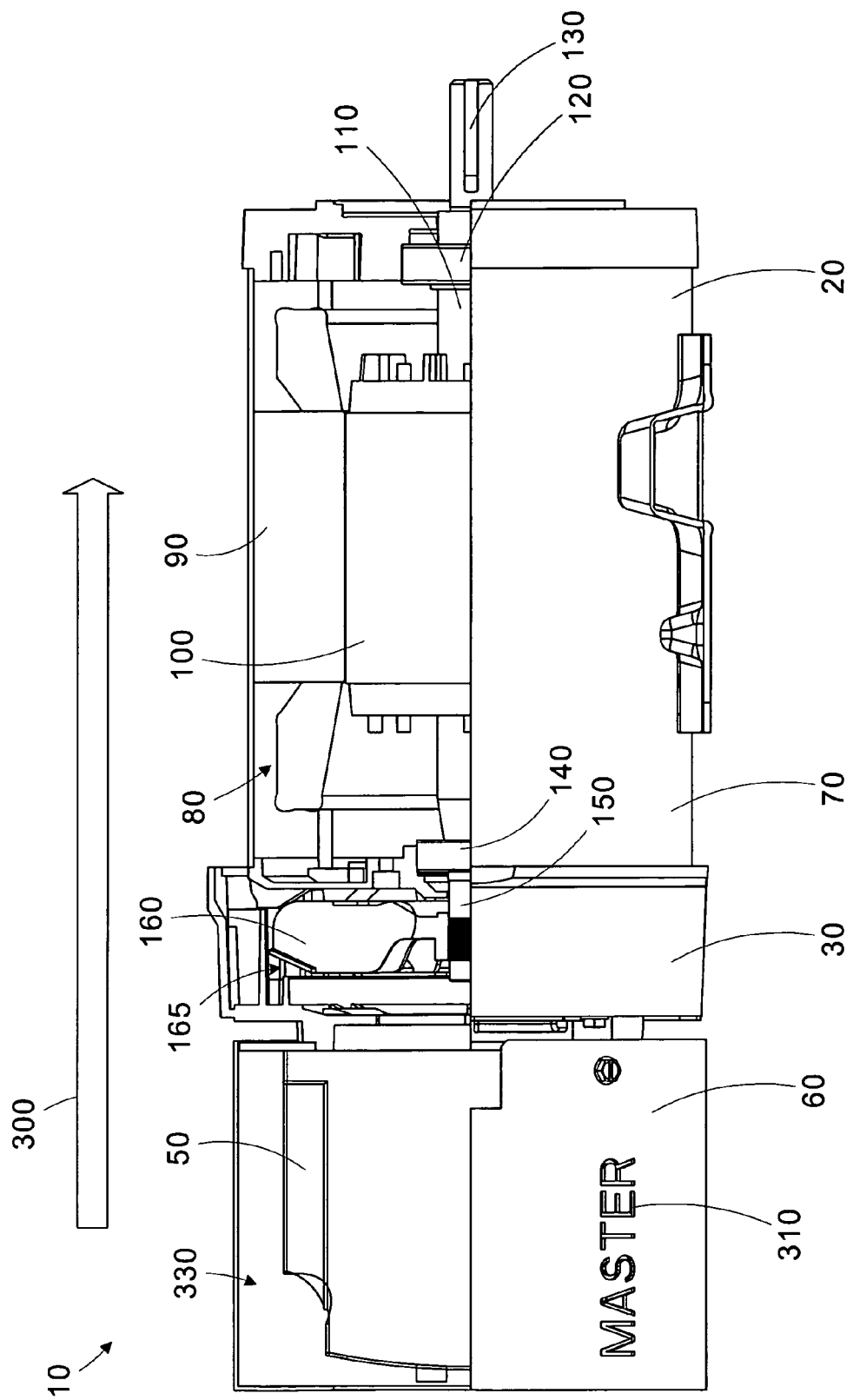
FIG. 3 is a side cutaway view of the motor and drive assembly of FIG. 1.

Referring now to the drawings wherein like reference numbers correspond to similar components throughout the several views and, specifically, referring to FIGS. 1, 2 and 3, the present invention shall be described in the context of a motor and drive assembly 10. The motor and drive assembly 10 includes an electric motor 20, fan shroud 30, mounting bracket 40, drive unit 50, and drive enclosure 60. As shown in FIG. 3, the electric motor 20 has a generally cylindrical housing 70 surrounding a motor core 80. The motor core 80 converts electrical energy to mechanical energy to drive external devices coupled to the motor 20. The motor core 80 includes a stator 90, a rotor 100, and any other wiring and circuitry (not shown) for driving the motor 20. The rotor 100 is coupled to a shaft 110 extending through a central longitudinal axis of the motor 20.

During operation of the motor 20, electrical current is provided to the windings of the stator 90 by the drive unit 50, which generates a magnetic field that induces a current in the windings of the rotor 100. The induced current in the windings of the rotor 100 also generates a magnetic field in an opposite direction with respect to the magnetic field generated in the windings of the stator 90. The oppositely directed magnetic fields interact and cause the rotor 100 to rotate, thus, rotating the shaft 110. The shaft 110 is supported by a first bearing assembly 120 disposed at a load end 130 of the shaft 110, and a second bearing assembly 140 disposed at a fan drive end 150 of the shaft 110. A fan 160 is mounted to the shaft 110 at its fan drive end 150 for providing cooling flow to the motor 20 and the drive unit 50 during its operation. The fan shroud 30 defines a fan cavity 165 enclosing the fan 160 and affecting the direction of the cooling flow.

Heat is generated by the motor core 80 during operation of the motor 20. The heat generated by the motor core 80 heats the air inside the housing 70. This heated air, if not dissipated, has a deleterious effect on the efficient operation and life of the bearing assemblies 120, 140 and insulation. Therefore, the fan 160 is provided to cool the motor 20. However, because the motor and drive assembly 10 includes an integrated drive unit 50, additional heat is also generated by the electronic circuitry used to implement the functions of the drive unit 50. The drive unit 50 is mounted in axial alignment with the motor 20 and fan 160 such that cooling flow generated by the fan 160 also flows over the drive unit 50, thereby removing additional heat generated by the drive unit 50. As described in greater detail below, the drive enclosure 60 constrains the cooling flow to ensure that it is provided both to the motor 20 and the drive unit 50.

In general, the drive unit 50 includes circuitry for generating drive signals for controlling the motor 20. The drive unit 50 includes rectifying circuitry that receives 1 or 3-phase power from an external power supply and converts the AC power to DC. Inverter circuitry in the drive unit 50 is positioned between positive and negative DC buses of the rectifier to generate the signals for driving the motor 20. The inverter circuitry includes a plurality of switching devices (e.g., transistors) that are positioned between the positive and negative DC buses and drive leads (not shown) coupled to the motor 20, such that by opening and closing specific combinations of the inverter switches, positive and negative DC voltage pulses are generated on each of drive leads. By opening and closing the inverter switches in specific sequences, AC voltages having controllable amplitudes and frequencies can be generated on each of the drive leads coupled to the motor 20.

As seen in FIGS. 1 and 2, the drive unit 50 includes a display 170 and one or more controls 180 for configuring the drive unit 50. For example, various operating parameters, such as speed, direction of rotation, operating state (i.e., on or off), etc., of the motor 20 may be set using the control 180. In some embodiments, the drive unit 50 may include an external data port (not shown) through which the drive unit 50 may be programmed or configured prior to installation. The particular configuration technique used to program the drive unit 50 is not material to the practice of the present invention, and may vary depending on the particular implementation.

Still referring the FIGS. 1 and 2, the assembly of the motor and drive assembly 10 is now described in greater detail. The fan shroud 30 is mounted to the motor 20 to enclose the fan 160 by bolts 190 that extend through holes 195 in the fan shroud 30 to interface with threaded holes 200 defined in the housing 70. The mounting bracket 40 mounts to the fan shroud 30 via bolts 210 that pass through holes 215 to interface with threaded holes 220 defined in the fan shroud 30. The drive unit 50 mounts to the mounting bracket 40 via bolts 230 that interface with threaded holes 240 defined in the mounting bracket 40. The mounting bracket 40 includes a generally ring-shaped body 245 and tabs 250 extending perpendicularly with respect to the body 245. The tabs 250 include threaded holes 260 aligned with corresponding holes 270 defined in the drive enclosure 60. Bolts 280 pass through the holes 270 in the drive enclosure 60 and interface with the threaded holes 260 defined in the tabs 250 to mount the drive enclosure 60. A first lead opening 285 defined in the fan shroud 30 and a second, corresponding lead opening 290 defined in the mounting bracket 40 allow electrical leads (not shown) from the drive unit 50 to pass through the fan shroud 30 and mounting bracket 40 to be connected to the motor 20.

The mounting configuration shown in FIGS. 1 and 2 is provided for illustrative purposes. Other mounting configurations may be used. For example, the drive unit 50 and/or the drive enclosure 60 may mount directly to the fan shroud 30 without an interposing mounting bracket.

In general, the fan shroud 30 and drive enclosure 60 cooperate to define the path for cooling air flow generated by the fan 160. In the illustrated embodiment, the fan 160 is bidirectional, such that regardless of the direction of rotation of the motor 20, cooling air flows in the direction provided by the arrow 300 shown in FIG. 3.

As seen in FIGS. 2 and 3, the drive enclosure 60 includes vents 310 and a window 320. The window 320 is generally provided to allow access to the drive enclosure 60 by an operator, however, in an embodiment where the drive unit 50 is preconfigured, the window 320 may be omitted. Also, in some embodiments, a gasket (not shown) corresponding to the geometry of the window 320 may be provided to provide a seal between the drive unit 50 and the drive enclosure 60 to reduce the likelihood that foreign material is drawn into the drive enclosure 60.

Intake air for the fan 160 enters the drive enclosure 60 through the vents 310. The drive enclosure 60 defines a drive cavity 330 surrounding the drive unit 50. Heat generated by the drive unit 50 heats the air present in the drive cavity 330. Because the intake air for the fan 160 is drawn in through the vents 310 and into the drive cavity 330, the heat from the drive unit 50 is dissipated by the intake component of the cooling flow. In the illustrated embodiment, the vents 310 are defined by openings in the drive enclosure 60 that spell the word "MASTER." However, other vent geometries may be used.

The fan shroud 30 includes one or more openings 340 to allow the passage of intake cooling flow through the fan shroud 30. The mounting bracket 40 includes a central opening 350 corresponding to the opening 340 defined in the fan shroud 30. Hence, intake air enters the drive enclosure 60 through the vents 310, traverses the drive unit 50, and passes through the opening 350 defined in the mounting bracket 40 and the opening 340 defined in the fan shroud 30 to reach the fan 160. Again, this direction of flow is indicated by the arrow 300 shown in FIG. 3. Hence, the intake component of the cooling flow cools the drive unit 50 prior to reaching the fan 160. The exhaust portion of the cooling flow generated by the fan 160 passes through the motor core 80 and exits through ports (not shown) defined in the housing 70 proximate the load end 130 of the shaft 110, thereby cooling the motor core 80.

The motor and drive assembly 10 of the present invention provides cooling flow for the drive unit 50 without necessitating auxiliary cooling, additional heat sinks, or modifications to the motor 20 or housing 70, thereby reducing the cost and complexity of the motor and drive assembly 10. The cooling flow generated by the fan includes an intake component that cools the drive unit 50 and an exhaust component that cools the motor 20.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. An assembly, comprising:
   a motor responsive to at least one drive signal;
   a fan axially aligned with the motor and operable to generate a cooling flow, at least a portion of the cooling flow traversing the motor;
   a fan shroud mounted to the motor and defining a fan cavity enclosing at least a portion of the fan and defining at least one opening communicating with the fan cavity;
   a drive unit disposed within the cooling flow and operable to generate the drive signal;
   a drive enclosure mounted to the fan shroud and defining a drive cavity enclosing at least a portion of the drive unit and at least one vent communicating with the drive cavity.

2. The assembly of claim 1, wherein the cooling flow comprises an intake component entering the drive enclosure through the vent, the drive unit being disposed in the intake component of the cooling flow.

3. The assembly of claim 2, wherein the cooling flow further comprises a an exhaust component generated as the intake component passes through the fan, the motor being disposed in the exhaust component of the cooling flow.

4. The assembly of claim 3, further comprising a mounting bracket mounting the drive enclosure to the fan shroud, wherein the drive unit is mounted to the mounting bracket.

5. The assembly of claim 4, wherein the mounting bracket includes a body member and at least one tab extending from the body member, the drive unit being mounted to the body member, and the drive enclosure being mounted to the tab.

6. The assembly of claim 1, wherein the motor includes a shaft, and the fan is mounted to the shaft.

7. The assembly of claim 6, wherein the drive unit is axially aligned with the shaft.

8. The assembly of claim 1, wherein the drive unit includes at least one of a display and a control, and the drive enclosure defines a window communicating with the drive cavity to expose at least a portion of the drive unit proximate the one of the at least one of the display and the control.

* * * * *